April 2, 1957     D. D. DUSTMAN     2,787,206
VEHICLE AIR CONDITIONING INTAKE DUCT
Filed April 9, 1954
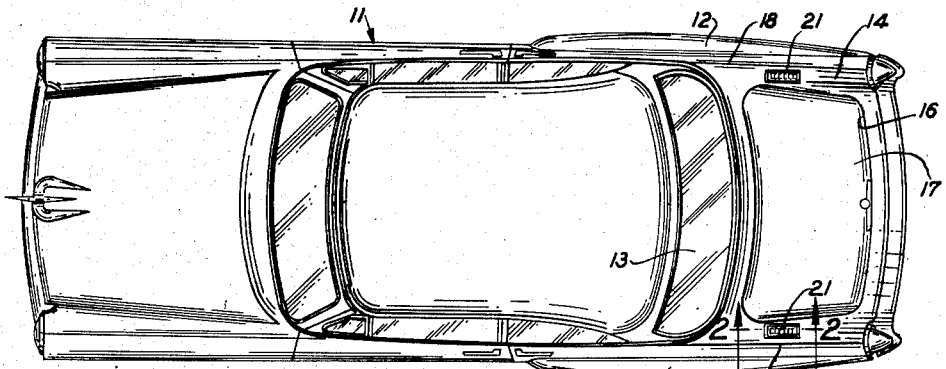
FIG. 1
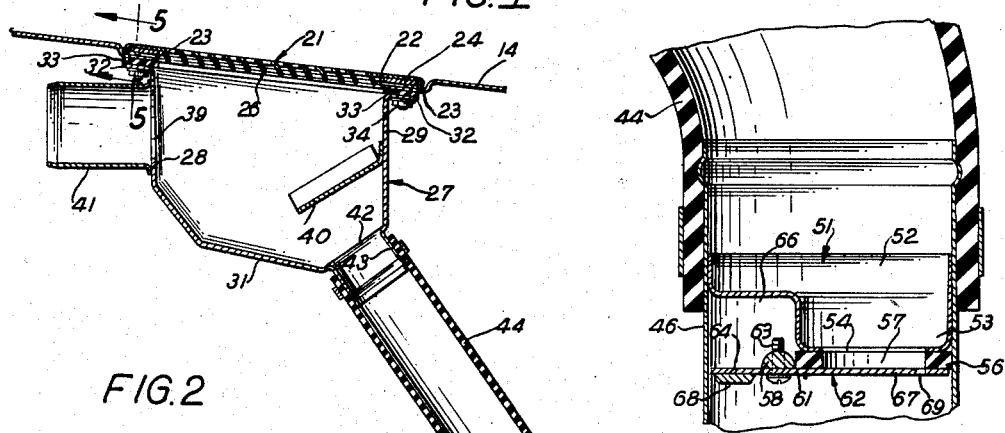
FIG. 2
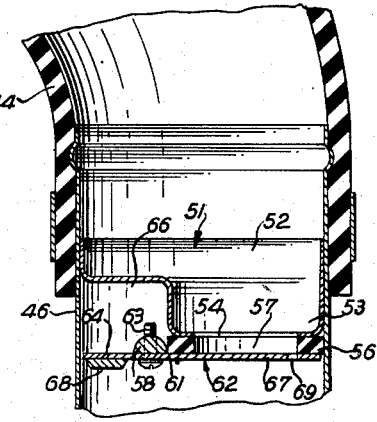
FIG. 3
FIG. 4
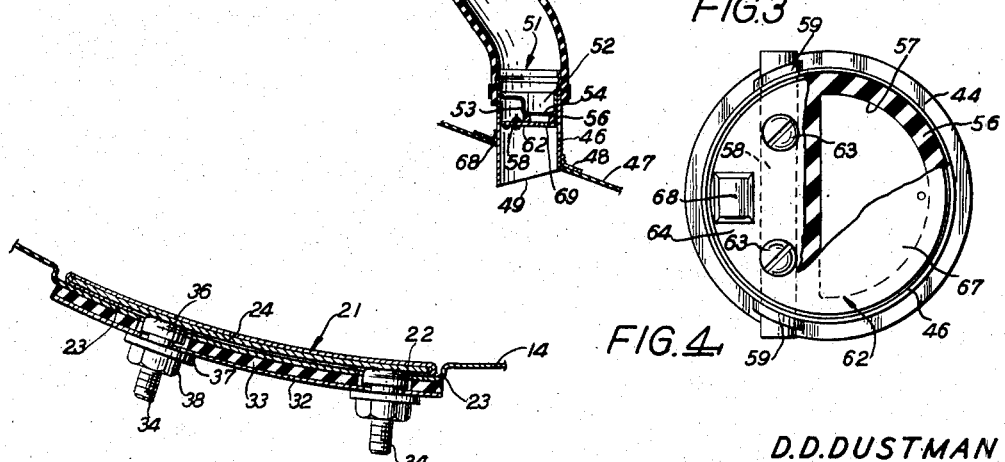
FIG. 5
D. D. DUSTMAN
INVENTOR.
BY E. C. McRae
J. R. Faulkner
G. H. Oster
ATTORNEYS

2,787,206

VEHICLE AIR CONDITIONING INTAKE DUCT

Darius D. Dustman, Dearborn, Mich., assignor to Ford Motor Company, Dearborn, Mich., a corporation of Delaware Application April 9, 1954, Serial No. 422,119

2 Claims. (Cl. 98—2)

This invention relates generally to motor vehicles, and has particular reference to an intake duct construction for a vehicle air conditioning system.

An object of the present invention is to provide air intake ducts for a motor vehicle air conditioning system in which the intake grilles are located on the generally horizontal rear deck panel of the vehicle. The construction includes a specially designed sump arranged to direct the incoming air forwardly to the air conditioning system and to drain rain water which may enter through the grilles downwardly and exteriorly of the vehicle body. The construction also incorporates valve means adjacent the lower end of the drain duct to prevent the entrance of air into the air conditioning system from beneath the vehicle, since this air may not be clean, yet to automatically expel water which may collect in the drain duct, either gradually if the accumulation is small or rapidly and intermittently if the accumulation is large.

Other objects and advantages of this invention will be made more apparent as this description proceeds, particularly when considered in connection with the accompanying drawing, wherein:

Figure 1 is a plan view of a motor vehicle incorporating the present invention.

Figure 2 is an enlarged cross sectional view through one of the air intake ducts, taken on the plane indicated by the line 2—2 of Figure 1.

Figure 3 is an enlarged fragmentary cross sectional view of the lower portion of the construction shown in Figure 2.

Figure 4 is a bottom plan view, partly broken away and in section, of the construction shown in Figure 3.

Figure 5 is an enlarged transverse cross sectional view taken on the plane indicated by the line 5—5 of Figure 2.

Referring now to the drawing, and particularly to Figure 1, there is illustrated a motor vehicle 11 having rear fenders 12 at opposite sides thereof, a rear window 13, and a rear deck panel 14 having a luggage compartment opening 16 formed therein and adapted to be closed by a luggage compartment lid 17 hinged at its forward end to the deck panel 14. In accordance with present practice, the rear fenders 12 are formed with their laterally outer sides gradually curved and terminating at their upper portions in a crown or ridge line 18 extending longitudinally of the vehicle and generally horizontally and in alignment with the vehicle belt line. The fender crown line 18 represents the uppermost portion of the fender and inwardly of the crown the sheet metal is gradually curved downwardly to form the generally horizontal rear deck panel 14. In the area between the fender crown 18 and the adjacent side edge of the luggage compartment opening 16 the surface is slightly concave but is approximately horizontal. It is in this area that the air intake grilles 21 for the air conditioning system are located.

This location of the intake grilles 21 behind the fender crown 18 partially shields them from view from the side of the vehicle, and is not objectionable from the styling or appearance standpoint. In addition, it provides a location permitting an abundance of clean air to be drawn into the system. It does, of course, permit the entrance of a certain amount of rain water, particularly when the vehicle is stationary, but the specific design of the duct as hereinafter described eliminates any difficulty from this score.

With reference particularly to Figures 2 and 5, the rear deck panel 14 is formed with an elongated opening 22 intermediate crown 18 of each fender and the adjacent edge of the luggage compartment opening 16. Adjacent the opening 22 the rear deck 14 is formed with a depressed marginal flange 23 to receive and support the marginal edge portion of the grille 21 and to permit the upper surface of the grille to be flush with the rear deck panel 14. The grille 21 is formed of a single stamping having its marginal edges bent around a peripheral reinforcing plate 24. The central portion of the grille 21 is formed with a plurality of integral transversely extending louvers 26 for directing the air downwardly and slightly rearwardly.

Directly beneath the opening 22 in the rear deck panel is a sump 27 having front and rear walls 28 and 29 respectively, a bottom wall 31, and an upper marginal flange 32. The interior cross sectional shape of the sump 27 corresponds to the size and shape of the opening 22, and the marginal flange 32 thus is positioned directly beneath the depressed flange 23 of the rear deck panel. A resilient gasket 33 is provided between the flanges 23 and 32 to form a weather-tight seal therebetween and insulate against noise. As best seen in Figure 5, a plurality of screws 34 are provided to secure the grille 21 and the sump 27 to the rear deck panel. The heads 36 of the screws 34 are welded to the lower surface of the reinforcing plate 24 of the grille 21 and extend through openings in the flanges 23 and 32 and the gasket 33 to receive washers 37 and nuts 38.

The forward wall 28 of the sump 27 is formed with a circular opening 39 leading to a flanged sleeve 41 welded to the wall 28 and extending in a forward direction therefrom. The sleeve 41 is adapted to be connected to a conventional conduit leading to the air conditioning unit of the vehicle to provide exterior air to the system.

The bottom wall 31 of the sump is formed at its rear portion with an opening 42 and with an integral sleeve portion 43 extending in an inclined direction downwardly and rearwardly therefrom. The opening 42 and sleeve 43 form the entrance to a drain outlet for rain water entering the sump 27 through the grille 21. A flanged baffle plate 40 is mounted upon the rear wall 29 of the sump 27 vertically above the drain opening 42 to direct incoming air forwardly toward the circular opening 39.

The drain outlet 43 is connected by means of a rubber hose 44 to the upper end of a tubular valve body 46. The valve body 46 is mounted in a vertical position and extends through an opening in the luggage compartment floor panel 47. A flanged ring 48 is welded to the floor panel 47 and to the valve body 46 to support the latter. The lower edge 49 of the valve body 46 is inclined upwardly in a rearward direction so that the tube will not act as an air scoop during forward motion.

Referring now to Figure 3, as well as to Figure 2, the valve body 46 contains a valve retainer 51. The valve retainer 51 has an upper cylindrical portion 52 sleeved within the valve body 46 and welded thereto, and a generally semi-circular deep drawn lower portion 53, the bottom wall of which is formed with a semi-circular opening 54. A rubber sealing member 56, having a semi-circular opening 57 formed therein corresponding in shape and size to the opening 54 in the bottom wall of the valve retainer, is cemented to the underside of the valve retainer.

A valve shaft 58 extends horizontally and transversely through the valve body 46, with its opposite ends journaled in apertured flanges 59 formed in the opposite side walls of the valve body. Intermediate its ends the upper portion of the valve shaft 58 is formed with a flat surface 61 to support a flat valve disc 62. The valve disc 62 is secured to the valve shaft 58 by means of a pair of screws 63.

It will be noted that the axis of the valve shaft 58 is offset with respect to the center of the valve body and is also at one side of the deep drawn lower portion 53 of the valve retainer 51. The valve disc 62 is thus divided into a narrow side 64 adapted to swing upwardly into the clearance space 66 formed at one side of the depressed portion 53 of the valve retainer and beneath the upper cylindrical portion 52 thereof, and a wide side 67 adapted to seat against the resilient seal 56 carried at the bottom of the valve retainer.

A weight 68 is secured, as by welding, to the underside of the narrow side 64 of the valve disc 62 and functions to normally hold the valve disc 62 in the position shown in Figure 3 in which the wide side 67 is in sealing engagement with the resilient seal 56 to thereby close the drain opening formed by the aligned holes 54 and 57 in the valve retainer and the sealing member respectively.

Thus, under normally operating conditions the valve body 46 is closed to the entrance of air from beneath the vehicle. All air for the air conditioning system is thus required to enter through the louvered grilles 21 mounted in the horizontal surface of the rear deck panel 14. Should rain water enter through a louvered grille 21, however, it will be carried through the sump 27 and the outlet hose 44 into the valve body 46 and the valve retainer 51. Upon the accumulation of a sufficient quantity of water therein the weight of the water will automatically override the weight 68 carried by the valve disc 62, causing the valve to open and the water to be expelled. With this arrangement the water is expelled intermittently and the valve disc is open only during a short period when the water is being expelled.

To prevent the accumulation of a small quantity of water in the valve body or valve retainer of an amount insufficient to open the disc valve 61, a small opening 69 is provided in the wide side 67 of the valve disc 62 in alignment with the openings 54 and 57. The opening 69 is, for example, about 1/16 inch in diameter and consequently too small to permit the entrance of an appreciable amount of air or dirt from beneath the vehicle. It will, however, permit a small amount of accumulated water in the valve body or valve retainer to gradually leak out.

It will be understood that the invention is not to be limited to the exact construction shown and described, but that various changes and modifications may be made without departing from the spirit and scope of the invention, as defined in the appended claims.

What is claimed is:

1. In a motor vehicle body having a rear fender, a generally horizontal rear deck panel having a luggage compartment opening therein, and a floor panel beneath said deck panel, said deck panel having an air intake opening therein intermediate the crown of said fender and the adjacent edge of said luggage compartment opening, a louvered grille mounted upon said deck panel covering said intake opening, a sheet metal sump beneath said intake opening secured to said deck panel, an air duct extending forwardly from the front wall of said sump, a drain duct extending downwardly from the rearward portion of the bottom wall of said sump, a cylindrical valve body extending through an opening in said floor panel and being secured thereto in a vertical position, a horizontal valve retainer mounted within said valve body and having a drainage opening therethrough, a valve in said valve body beneath said valve retainer mounted for pivotal movement about a horizontal axis to close the drainage opening in said valve retainer, and a counterweight secured to said valve at a point offset from said axis to automatically hold said valve in horizontal closed position adjacent said valve retainer to prevent the entrance of air through said valve body from beneath said vehicle but adapted to be overridden by the accumulation of a predetermined amount of water in said valve body to open said valve and drain said water, and a flexible conduit interconnecting said outlet duct and said valve body.

2. In a motor vehicle body having a crowned rear fender merging into a laterally extending generally horizontal rear deck panel having a luggage compartment opening therein, and a luggage compartment floor panel extending generally horizontally beneath said rear deck panel to form therewith a luggage compartment, said rear deck panel having an air intake opening therethrough intermediate the crown of said fender and the adjacent edge of said luggage compartment opening, a louvered grille mounted upon said deck panel covering said intake opening, a sheet metal sump beneath said intake opening and having an upper marginal flange positioned beneath said deck panel in alignment with the outer portion of said intake grille, common fastening means securing said intake grille and the upper marginal flange of said sump to said deck panel, an air duct extending forwardly from the front wall of said sump, a drain duct extending downwardly from the rearward portion of the bottom wall of said sump, a deflector secured to the rear wall of said sump above said drain duct and extending forwardly and downwardly therefrom between the side walls of said sump to direct air entering through said louvered grille forwardly toward said intake duct, a tubular valve body extending through an opening in said luggage compartment floor panel generally beneath said drain duct and secured to said floor panel in a vertical position, a flexible conduit interconnecting said drain duct and said tubular valve body, a peripherally flanged valve retainer within said tubular valve body having its side flange secured to the valve body and its lower wall formed with a drain opening therein at one side of the axis of said valve body, said lower wall having an upwardly offset portion at the opposite side of said valve body, a resilient seal beneath said valve retainer having an opening herein corresponding to the drain opening in the valve retainer, a generally horizontal pivot shaft extending between the opposite walls of the tubular valve body and journaled therein and located on the opposite side of the axis of said valve body from said drain opening, a flat circular valve secured to said pivot shaft, and a counterbalancing weight carried by said valve on the side of said pivot shaft opposite said drain opening to normally hold said valve in engagement with said seal to close said drain opening and prevent the entrance of air from beneath said vehicle into said sump through said valve body yet adapted to be overridden by a predetermined weight of water in said valve body above said valve retainer to move said valve away from said drain opening to permit the escape of water through the open lower end of said valve body, and a small opening in said flat valve in alignment with the drain opening in said valve retainer to permit a relatively slow escape of water through said valve body at all times.

References Cited in the file of this patent

UNITED STATES PATENTS

| | | |
|---|---|---|
| 1,643,966 | Swartwout | Oct. 4, 1927 |
| 2,235,642 | Lintern et al. | Mar. 18, 1941 |
| 2,565,555 | Goldberg | Aug. 28, 1951 |
| 2,670,671 | Haltenberger | Mar. 2, 1954 |

FOREIGN PATENTS

| | | |
|---|---|---|
| 461,603 | Great Britain | Feb. 19, 1937 |